(No Model.)
I. A. TELLER.
KITCHEN UTENSIL.
No. 338,449. Patented Mar. 23, 1886.
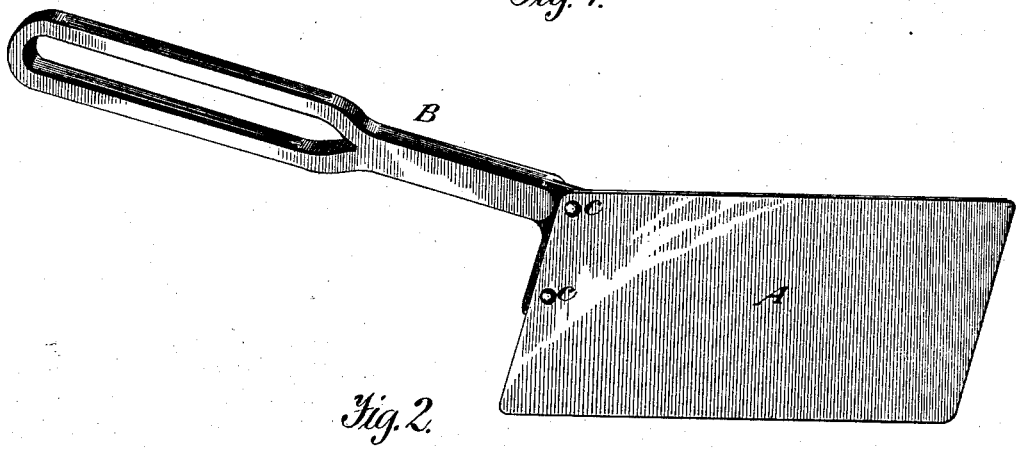
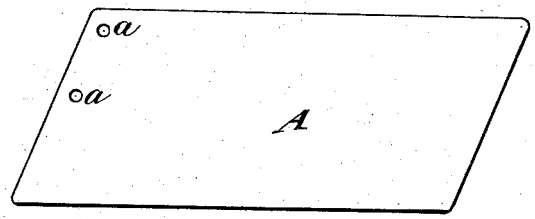
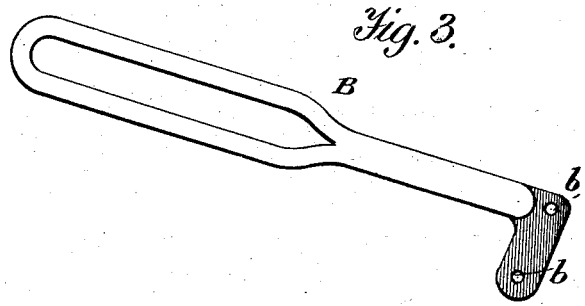
Witnesses.
A. Ruppert
Glenn Brown
Inventor.
Mrs. Ida A. Teller,
Per,
Thomas P. Simpson
Atty.

UNITED STATES PATENT OFFICE.

IDA A. TELLER, OF UNADILLA, NEW YORK.

KITCHEN UTENSIL.

SPECIFICATION forming part of Letters Patent No. 338,449, dated March 23, 1886.

Application filed December 29, 1885. Serial No. 186,897. (No model.)

*To all whom it may concern:*

Be it known that I, IDA A. TELLER, a citizen of the United States, residing at Unadilla, in the county of Otsego and State of New York, have invented a certain new and useful Improvement in Kitchen Utensils; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of my invention is to make a utensil which may be used for several different purposes, thus saving expense and facilitating the operations of the kitchen.

Figure 1 of the drawings is an elevation in perspective of the device which constitutes my invention. Fig. 2 is a detail view of the blade; and Fig. 3 is a similar view of the handle.

In the drawings, A represents the blade, which is made of sheet-steel, of uniform thickness, preferably oblong, with the corners slightly rounded.

B is the handle, which, for the sake of cheapness, may be made of cast-iron or any other suitable material.

The blade A and handle B are provided with corresponding holes $a$ $b$, by which the rivets $c$ may securely fasten them together. These holes are so arranged that the handle B may be attached to one corner of the blade and at an obtuse angle thereto, so that it may be more conveniently used in performing its intended functions. The holes $b$ $b$ in the arm, which extends at an angle from the handle, may be countersunk on one side to receive the heads of the rivets. It will be perceived that this arm is placed on one side of the blade, so that the blade will run without friction and evenly under the cake or other article which is to be turned on the skillet or other cooking utensil or lifted therefrom. Thus it will be perceived that a fish, egg, omelet, or other article may be handled quickly and without danger of fracture.

My utensil is also specially adapted to chop potatoes or other vegetables, as well as for scraping kettles, pushing the apron of cream from small pans of milk and taking cookies from the fire. Although a single utensil, it is thus well adapted to many purposes, and yet involves the cleaning of but one article. The handle is also slotted, so that it may be hung up and always be in view.

Having thus described all that is necessary to a full understanding of my invention, what I claim as new, and desire to protect by Letters Patent, is—

A kitchen utensil consisting of a thin blade of steel having a uniform thickness, and a handle fastened to one corner at an oblique angle to the blade, whereby it may be conveniently used, as described.

In testimony whereof I affix my signature in presence of two witnesses.

IDA A. TELLER.

Witnesses:
 L. M. COWLES,
 E. D. EMERSON.